United States Patent [19]

Amaya

[11] Patent Number: 5,277,221
[45] Date of Patent: Jan. 11, 1994

[54] GAS FEED VALVE FOR DOMESTIC APPLICATIONS AND THE LIKE

[75] Inventor: Jose A. Amaya, San Luis Potosi, Mexico

[73] Assignee: Instituto Mexicano de Investigaciones de Manufacturas Metal Mechanicas, A.C., San Luis Potosi, Mexico

[21] Appl. No.: 987,687

[22] Filed: Dec. 9, 1992

[30] Foreign Application Priority Data

Feb. 6, 1992 [MX] Mexico .................... 92 00520

[51] Int. Cl.⁵ ........................................ F16K 11/083
[52] U.S. Cl. ...................... 137/454.6; 137/454.2; 137/625.47; 251/145; 251/207
[58] Field of Search ............. 137/625.47, 454.6, 454.2, 137/905; 251/145, 207

[56] References Cited

U.S. PATENT DOCUMENTS

| | | | |
|---|---|---|---|
| 676,536 | 6/1901 | Ferguson | 137/905 X |
| 1,899,826 | 2/1933 | Rice | 137/625.47 X |
| 3,746,039 | 7/1973 | Demi | 251/145 X |
| 4,187,872 | 2/1980 | Freeman et al. | 137/454.6 |
| 4,823,838 | 4/1989 | Ferlin | 137/624.12 |
| 4,927,747 | 5/1990 | Nitta | 431/344 |
| 4,929,176 | 5/1990 | Nitta | 431/344 |

OTHER PUBLICATIONS

Robertshaw Controls Co., "Flame Repeatability East as One-Two-Three," Proportional Flow Gas Valve, Model BP Catalog, cover page & pp. 8, 9, 14 (date unknown).

*Primary Examiner*—Arnold Rosenthal
*Attorney, Agent, or Firm*—Rothwell, Figg, Ernst & Kurz

[57] ABSTRACT

The space necessary for the installation of gas feed valves for domestic applications and the like of the type wherein gas feed valves take gas from a main gas feed duct and deliver it to gas using units is minimized by arranging the valves within the main gas feed duct, and by providing valves which include a valve body having at least one gas admission orifice opening directly within the gas space of the duct and a gas discharge, section opening outside of the duct. The valve body is fixedly arranged within the gas space of the duct by a suitable clamping arrangement, the valve body having a valve member concentrically arranged within the same for closing and opening the admission orifice and the discharge section. A valve cap is attached to the end of the valve body opposite the discharge section, and a valve stem is coupled to the valve member and is supported by the cap, with the clamping arrangement being provided respectively at the valve cap and at the discharge section, whereby the only portions of the valve which protrude outwardly of the gas feed duct are the discharge section on one side of the duct and the valve cap and valve stem on the opposite side of the duct.

7 Claims, 4 Drawing Sheets

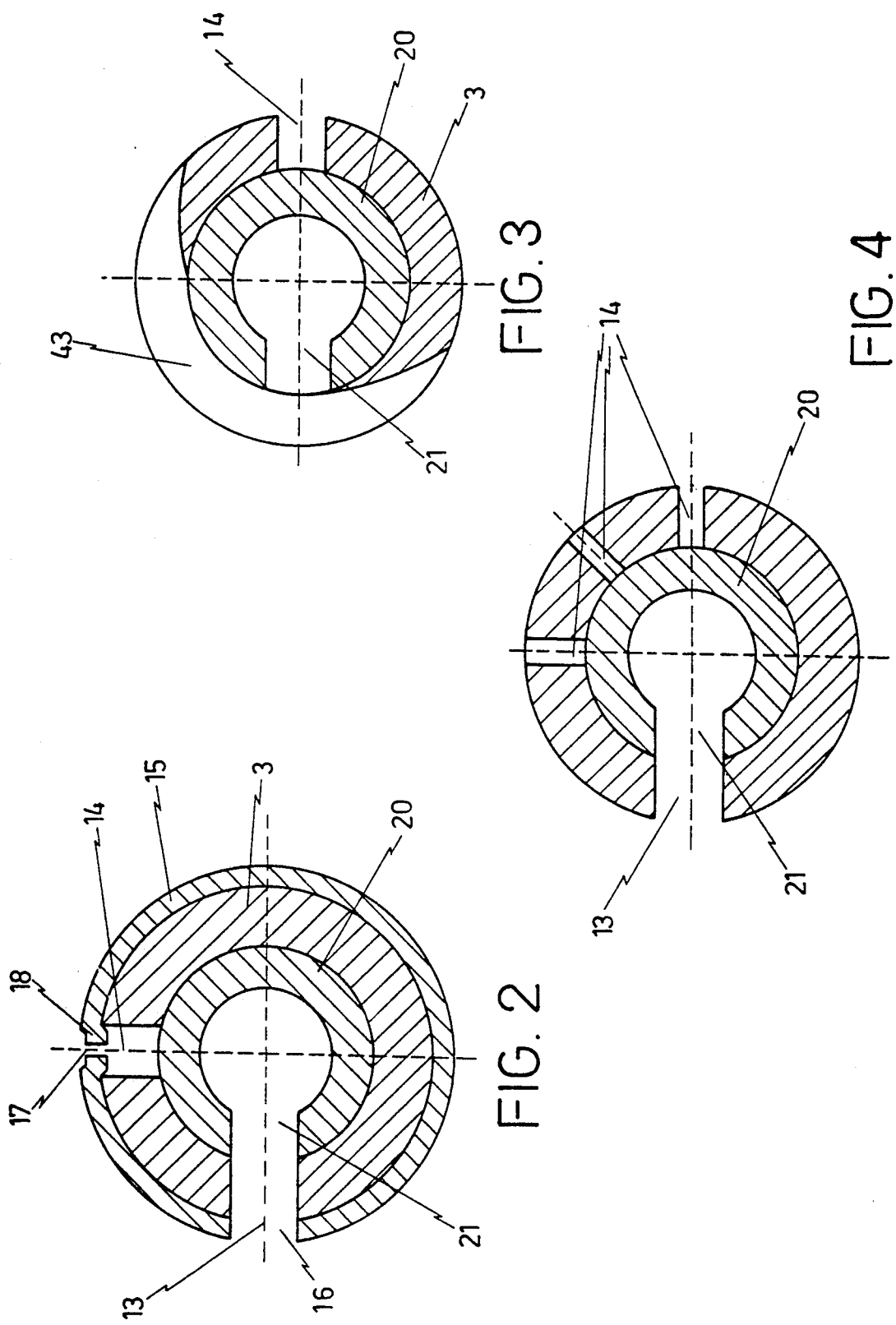

GAS FEED VALVE FOR DOMESTIC APPLICATIONS AND THE LIKE

FIELD OF THE INVENTION

The present invention refers to devices for handling, supplying and controlling fuel gases for the production of heat and, more particularly, it is related to a gas feed valve for domestic applications and the like, suitable for being mounted transversely within the gas feed duct, in order to reduce the space necessary for the valve, as well as to avoid the existence of special fittings for connecting the supply duct to the valve.

BACKGROUND OF THE INVENTION

The ever growing demand for domestic appliances which handle, supply and control fuel gases for producing heat, as well as the difficulties encountered and the high cost of providing a suitable supply of this type of energetics, has brought about a need for improved devices of these types. Manufacturers of these devices have been working and developing for many years a great variety of fuel gas systems, which are intended not only to provide a suitable and esthetic arrangement that may reduce the mounting space of the valves which regulate the passage of gas towards the burners of stoves or heaters that use this type of fuels, but also to reduce the amount of material required to manufacture the valve itself, while at the same time providing said valve with the functionality and versatility required to accomplish the most efficient use of the calorific power of the fuel, in the function of a suitable control of the fuel flow.

In the particular instance of the fuel gas feed systems presently used in domestic appliances such as cooking stoves, there is a vast plurality of manually actuated valves which are typically mounted by means of a branch conduit which is part of the body of the valve, which in turn serves as a gas duct between the main gas supply duct and the valve itself. However, although these types of valves permit a suitably regulated gas supply towards the burner, their construction presents the great drawback of not permitting reduction of the distance between centers of the gas feed duct and the valve, beyond what is permitted by said branch conduit, which calls for a relatively large mounting area within the stove in order to assemble the main gas supply duct with the. consequently, the cross section of said valves and said gas supply duct does not show a regular shape, causing the manufacture and particularly the machining operation therefor to be more complicated and costly.

As a consequence of the above, and particularly due to the fact that all the prior art valves normally require a gas inlet duct and a gas outlet duct connected to the valve, generally in diametrically opposite directions, and fittings are necessary for connecting said inlet duct with the main gas supply duct, said valves show a relatively large number of drawbacks. Those skilled in the art have been exercising every effort to provide a gas valve to be mounted transversely within the gas supply or feed duct, which besides avoiding the above discussed drawbacks, will offer substantial advantages both as to its arrangement as well as to its flow control characteristics, at the same time permitting a decrease in the amount of material in the body of the valve and a reduction of the space for mounting the valves.

However, to the knowledge of applicant, all the prior art gas feed valves which take the fuel gas from the main distribution duct of a domestic appliance in order to conduct the gas to the individual burners or pilots are generally mounted outwardly of said main gas distribution duct and, therefore, a considerable space is necessary for mounting said valves. In addition, a considerable amount of fittings for connecting said valves to the main duct are normally necessary. Therefore, up to the present date, no noticeable advance has been made in connection with the design of a valve that may be mounted interiorly of the distribution duct without the need of providing external fittings for connecting the gas duct to the valve.

SUMMARY OF THE INVENTION

Having in mind the defects of the prior art gas feed valves for domestic applications and the like, it is an object of the present invention to provide a gas feed valve for being mounted transversely and internally of the main gas supply duct, which will be of a very simple and economical construction and, however, of high reliability for handling, supplying and controlling fuel gases.

It is another object of the present invention to provide a gas feed valve of the above described character, which will permit a decrease in the amount of material necessary for the valve body, and at the same time will offer the possibility of providing a large variety of arrangements for the gas handling.

It is one more object of the present invention to provide a gas feed valve of the above mentioned character, which will permit the reduction of the necessary mounting space for housing the gas feed valve and gas supply duct assembly within a domestic appliance such as a cooking stove.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 2 is a cross sectional plan view taken along lines A—A' of FIG. 1 of the drawings, and looking in the direction of the arrows, for showing a valve built in accordance with the embodiment of the invention shown in FIG. 1.

FIG. 3 is a view similar to FIG. 2, but showing a second embodiment of the valve in accordance with the present invention.

FIG. 4 is a view similar to FIG. 2, but showing the corresponding parts of a valve built in accordance with a third embodiment of the present invention.

DETAILED DESCRIPTION

Figure 1:
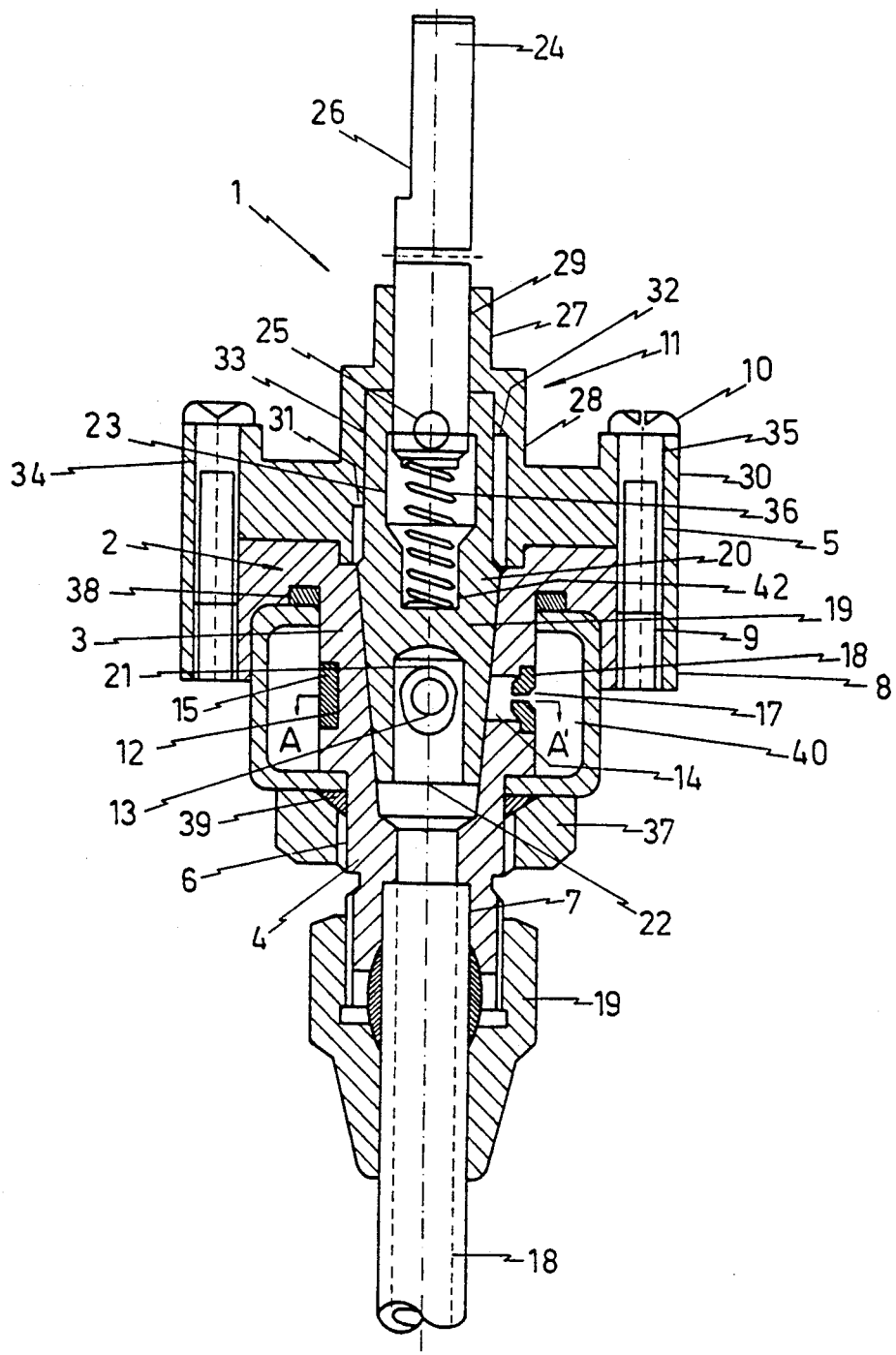
FIG. 1 is a side elevational cross-sectional view of a gas feed valve built in accordance with a preferred embodiment of the present invention.

With reference to the drawings and more particularly to FIG. 1 thereof, there is shown a gas feed valve 1 mounted transversely and internally of the gas supply duct 40, suitable for domestic applications and the like and built in accordance with a preferred embodiment of the present invention. Said gas feed valve 1 comprises a hollow valve body 2 which has a stepped cylindrical shape on the outer surface thereof, and a frusto conical shape on the interior surface thereof. The valve body 2 comprises an upper portion 3 of larger diameter having at its upper end a clamp 5, preferably of a rectangular shape, and still more preferably of a square form, and a lower portion 4 of smaller diameter and having at its lower end two threads 6 and 7 of different diameters, for coupling of the valve with the main gas duct on the one hand and with the fitting for conducting the gas to the burner or the like on the other hand. The thread 6 has a larger diameter for permitting the threaded coupling of a nut 37 for fixing the valve to the gas supply duct 40, which comprises a machined conical cavity at the face which is to be contacted with the duct, and the function of which is to house a seal or packing ring 39 which is interposed between said nut 37 and the outer surface of the duct 40. Thread 7 has a smaller diameter but has a dimension sufficient to be coupled to the gas pipe 18 which feeds the burners or the like, through a coupling device 19 that may be of the bell and spigot type or the like. The clamp 5 actuates as a first coupling member and comprises two short projections 8 parallel to the valve body, one projection at each end thereof, which clamp the edges of the gas supply duct 40 for permitting the valve 1 to be firmly mounted crosswisely and internally of said duct 40. Gas supply duct is preferably of a rectangular cross-sectional shape, having a dimension suitable for containing therewithin, that is, between its walls, the center portion of the main valve body 2 of valve 1.

Although FIG. 1 of the drawings shows the duct 40 and the clamp 5 as rectangular members, it will be obvious to any one skilled in the art that said duct and clamp may adopt any geometrical shape, provided that the coupling therebetween may be possible.

Valve 1 also comprises a cap 11 which is placed on the valve body 2, over the clamp 5 of the same and firmly fixed to said clamp through suitable fastening means such as, for instance, at least a through bore 9 having an inner thread at each one of the ends of the clamp, which passes through the cap 11 and through the clamp 5 along the projections 8, to permit the introduction of fasteners 10, preferably normal threaded screws or bolts. The cylindrical valve body 2 thus comprises, centered along the length of the portion 3 of the body, and under the clamp 5, a peripheral groove 12 which is relatively wide and shallow, and comprising at the bottom thereof, circumferentially spaced at a short distance, a bore 13 of larger diameter and a bore 14 of smaller diameter. Both bores open toward the interior of the portion 3 of the valve body 2 and are disposed perpendicularly to each other, whereby bores 13 and 14 permit the introduction of the gas therethrough towards the interior of the valve, to thereafter be guided towards the burners.

A C-shaped restrictor ring 15 having its ends spaced apart by a cut-away portion of a length equal to the diameter of bore 13 of the valve body is arranged within groove 12, the ring 15 comprising a cut-away portion 16, as shown in FIG. 2, and an orifice 17 of reduced diameter to permit a minimum flow of gas therethrough. The orifice 17 of reduced diameter is formed at the center of an embossment 18 protruding towards the interior of the ring which, when the cut-away portion 16 matches the position of the bore 13, is inserted within the bore 14 to fix, during normal operation of valve 1, the position of the restrictor ring 15 relative to the body portion 3 of the main valve body 2 and relative to the cut-away portion 16, such that the cut-away portion 16 always coincides with the bore 13, which permits the valve to have a controlled gas supply to be sent to the burners or the like. The restrictor ring 15 is made of an elastic material and is interchangeable depending on the conditions of minimum flow to be used for different types of gases and also for different types of domestic appliances.

Valve 1 also includes, housed within the valve body 2, a valve member 19 which constitutes a gas commuter. Valve member 19 comprises a first or lower section 20 of a frusto conical shape, perforated at its lower or smaller diameter end for providing an axial cylindrical bore therethrough, as shown at 22, and a second or upper section 23 of a hollow cylindrical stepped shape, such that the lower or smaller diameter portion of the interior of the cylindrical hollow portion 23 extends towards the interior of the upper or larger diameter portion of the frusto conical section 20.

The frusto conical section 20 comprises a radially extending bore 21 through its side wall, bored perpendicularly to said orifice 22, with both the bore 21 and the axial cylindrical bore 22 being in communication with each other to permit the passage of gas towards the burner of the domestic appliance or the like.

Figure 5:
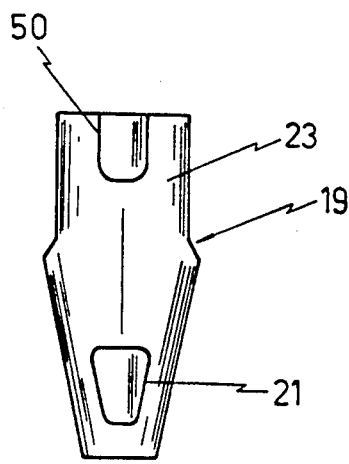
FIG. 5 is an elevational view of the lower portion of the valve stem of the valve of FIG. 1 in a disassembled condition to show details thereof.

The valve member 19 comprises, in its cylindrical section 23, and on the side wall of the same and colinear with the orifice 21, a slot 50, clearly shown in FIG. 5. The slot 50 extends axially to said valve member 19 and opens at the upper edge thereof.

Within the cylindrical hollow portion 23 of the valve member 19, a cylindrical valve stem 24 to operate the valve is arranged, said valve stem having on its side wall extending perpendicularly thereto near its lower end, a positioning bolt 25 designed to be introduced in the slot 50 of the side wall of the cylindrical portion 23 of valve member 19 during the operation of the valve, in order to couple the valve stem 24 with the valve member 19 to rotate the same. The operation of the valve stem 24 in association with the positioning bolt 25 permits the placement of the valve member 19 at three different positions for controlling the passage of gas. A first position in which a maximum flow is permitted is when the bore 21 of the side wall of the valve member 19 coincides with the larger diameter bore 13 of the main valve body 2 of valve 1 and with the cut-away portion 16 of the restrictor ring 15. A second position in which a minimum flow is permitted is when said bore 21 of the valve member 19 coincides with the position of the smaller diameter bore 14 of the main valve body 2 of valve 1 and with the reduced diameter orifice 17 of the restrictor ring 15. Finally, a third position in which there is absence of flow or total closure of the valve is when the bore 21 of the valve member 19 is placed at a distance of 180° with respect to the position of the bore 14 of the main valve body 2 of valve 1.

The cap 11 of the valve comprises a hollow cylindrical body, with steps both externally and internally and comprising a smaller diameter section 27 and a larger diameter section 28, the latter ending in a flange 30 for attaching said cap 11 with the clamp 5 of the valve body 2 and including in each one of its ends a projection 34 perpendicular to the horizontal plane of the flange 30. Projections 34 projecting outwardly and directly opposite to the projections 8 of the clamp 5 an are also provided with an at least a bore 35 with inner thread, such that they will match with the bores 9 of the clamp 5 for permitting the incorporation of the fasteners 10 within the bores 35 of said flange of the cap 11 and bores 9 of the clamp 5, in order to firmly fasten the same. The bores 9 and 35 are preferably arranged in a diagonal fashion at each end of the flange 30 of cap 11, as more clearly shown in FIG. 6.

The valve stem 24 for operating the valve member 19 is inserted within the bore 29 which extends longitudinally through the center of the stepped sections 27 and 28 of cap 11. The cap 11 also includes, within the larger diameter section 28, two semicylindrical shoulders 31 and 32 of different heights. The shoulders are formed on the inner surface 33 of cap 11 as shown in FIG. 1, with one of said shoulders extending circumferentially on said surface 33 and spanning one half of the circumference and the other one of said shoulders also extending circumferentially on surface 33 and spanning the other half of the circumference, as more clearly shown in FIG. 6. Shoulder 31, as seen in FIG. 1, is placed at a lower level within wall 33, whereas shoulder 32, as seen in FIG. 1, is located at a higher level within said wall 33, for a purpose that will be clear from what follows. For the purpose of explaining the operation of shoulders 31 and 32 and its relationship with the bolt 25 of valve stem 24, shoulder 31 will hereinafter be called the high shoulder and shoulder 32 will hereinafter be called the low shoulder.

Figure 6:
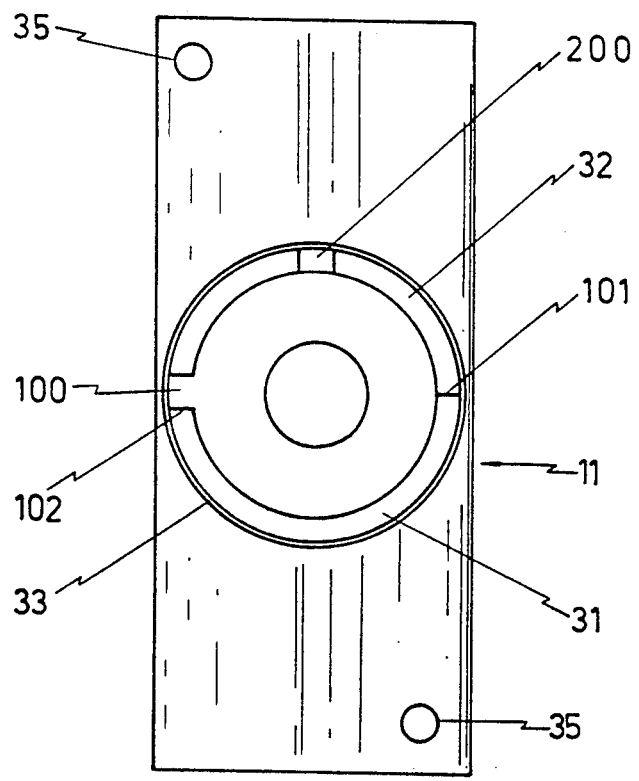
FIG. 6 is a bottom plan view of the cap of the valve in a disassembled condition to show inner details thereof.
Figure 7:
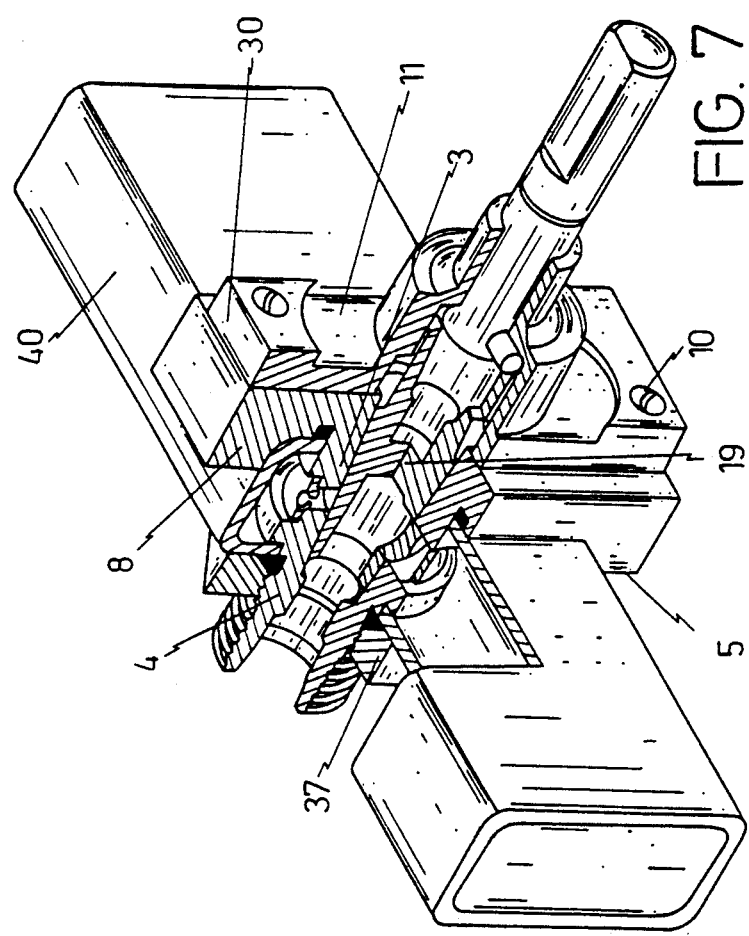
FIG. 7 is a perspective view, with sections cut away to show inner details, of the valve built in accordance with the preferred embodiment of the present invention, shown in its relationship with the main gas supply duct within which it is incorporated.

A slot 100 is provided on the surface of the low shoulder 32 at one of the ends thereof and immediately next to the end of the high shoulder 31 as clearly shown in FIG. 6. A second slot 200 is also provided on the surface of the low shoulder 32 at mid distance from its ends, that is, at a distance of 90° from slot 100. Slot 100 is on the same line as the orifice 21 and the bore 22 of the valve body 2 for a purpose that will be described in detail hereinafter.

The shoulders 31 and 32, in combination with the slots 100 and 200, form three guiding stops which permit the valve body 2 to stop in three different positions as described above, namely: a first position in which the valve is fully closed, when the bolt 25 of valve stem 24 abuts the edge 102 of high shoulder 31 and remains within slot 100 of low shoulder 32, wherein the opening 21 of the valve member 19 is placed against the solid inner wall of the valve body 2; a second position in which the valve is fully open, when the bolt 25 is within the slot 200 of low shoulder 32, wherein the opening 21 of the valve member 19 matches the opening 13 of valve body 2 and the cut-away portion 16 of the restrictor ring 15; and a third position in which the valve is open at a restricted flow, when the bolt 25 abuts the edge 101 of high shoulder 31 and the opening 21 of the valve member 19 matches the reduced diameter bore 14 of valve body 2 and the orifice 17 of the embossment 18 of restrictor ring 15.

The rotatory actuating valve stem 24 which is inserted within the bore 29 of the cap 11 is of cylindrical form and in its end opposite to that which carries the positioning bolt 25 it has, as is typical, a countersunk portion 26 sidewardly arranged from its free end to approximately half of its longitudinal dimension, for permitting the coupling of said stem 24 with a suitable handle for facilitating the angular rotation of the same, such as a plastic knob or a metallic lever, as is common in all types of valves.

Housed within the smaller diameter portion 42 of the cylindrical section 23 of the valve member 19 is a spring 36. One end of said spring is for bearing on the bottom of the hollow portion 43, and the other end of said spring is for bearing on the end of the valve stem 24 which carries the bolt 25, in order to exercise an outwardly directed bias on said stem 24 and permit the positioning bolt 25 to enter into the slots 100 and 200, as described above, during the opening and closing operations of valve 1, thereby rendering it possible to control the rotation of the actuating stem 24 and the valve member 19 by means of the three guiding stops 100/102, 200 and 101 (FIG. 6), when the positioning bolt 25 abuts or enters into the same.

The nut 37 is threadably coupled to the threads 6 of the main valve body 2 and, besides permitting the fixation of the valve and gas supply duct assembly, at the same time exercises a pressure on the packing ring 39 located between the nut 37 and the outer surface of the gas supply duct 40 within a machined conical cavity carved in the nut 37. The packing ring 38 is located between the clamp 5 and the opposite surface of the gas supply duct 40, which provides for the incorporation of the necessary seals for preventing leakage of gas.

It is to be noted that the above described valve offers a great versatility, inasmuch as, for instance, if it is required, the rectangular section of the gas supply duct may be modified in order to provide a square, a circular or any other special type of cross section, provided that said section may permit housing of and fixing to the main body of the valve with safety. The section of the valve member may also be modified in accordance with the specific requirements for controlling the elements which receive the gas from the valve, such as by providing a variable regulation of the gas flow. This variable regulation of the gas flow may be obtained by machining, for instance, a V-shaped groove 43 on the upper portion 3 of the main body 2 of the valve, as it is shown in FIG. 3 of the drawings, which by gradually reducing its width, permits that, upon rotation of the valve member 19, a restriction be generated for the passage of gas, which varies in function of the angular displacement of said valve member 19. Also, the diameter of the orifices 13 and 14 provided in the upper portion 3 of the main body 2 of the valve may be either increased or reduced in size, in order to obtain different flow rates of gas, such as it is shown in FIG. 4 of the drawings.

The valve of the present invention is also capable of accepting different shapes of coupling clamps to satisfy a specific need, which may vary in function of the type of section used for the gas supply duct. All of this is possible because of the peculiar design of the valve of the present invention which, on eliminating the use of a branch conduit for mounting the same in its connection with the gas supply duct and by being provided with a valve body of circular section which facilitates the machining thereof, permits the substantial reduction of both the volume of the material for its manufacture, and the cost of production thereof.

From the above description it may be seen that the gas feed valve built in accordance with the present invention may offer a practical and functional solution to the space problems that are presently suffered in the gas supply systems for domestic appliances, as well as those derived from an inadequate handling and control in the supply of the fuel gases, by providing a valve that may be transversely mounted inside a gas supply duct, which in turn may adopt any geometrical shape, preferably rectangular. The typical mounting by means of a branch conduit which serves as a gas conduit between the gas supply duct and the valve itself may be fully eliminated, thus permitting the minimization of the mounting space in the domestic appliances to which it is incorporated. On the other hand, the central portion of the main body of the valve will be contained within the interior of the gas supply duct, thereby providing better characteristics for the control of the gas flow when the valve body is permanently in contact with the supply gas, which also allows the introduction of the gas through at least a pair of orifices of different diameters, which are able to vary the amount of gas supply in accordance with the specific needs of the equipment which will receive the gas delivered by the valve.

As it will be apparent to anyone skilled in the art, the invention is not restricted to providing one single arrangement in the gas flow regulating zone, inasmuch as both the main body of the valve which comprises the gas supply orifices, and the restrictor ring which is incorporated around a peripheral groove of the valve body, may have more than one variant, such that the gas regulating stages may also be modified depending on the arrangement of the gas flow regulating zone.

Although certain specific embodiments of the present invention have been shown and described, it is to be understood that many modifications thereof are possible. The present invention, therefore, is not to be restricted except insofar as is necessitated by the prior art and by the spirit of the appended claims.

What is claimed is:

1. A gas feed valve for domestic applications and the like, said valve being transversely mounted within the gas space of a main gas feed duct which carries gas to a domestic appliance or the like, said valve comprising a hollow valve body having two radially outwardly directed inlet bores on a side wall thereof, said inlet bores being provided at a position along the length of said valve body such that they will open within the interior space of said gas feed duct, said two inlet bores being spaced 90° along the circumference of said valve body, one of said bores being of a predetermined larger diameter and the other of said bores being of a smaller diameter in order to provide maximum and minimum gas rates of flow, respectively, depending on the position of a valve member within said hollow valve body, and an axially extending outlet section, said outlet section extending at a distance from said inlet bores such that it will open outside of said gas feed duct, said valve member having a radially extending bore capable of matching either one of said two inlet bores and an axial bore corresponding to said outlet section of the valve body, a valve cap on the end of said valve body opposite to said outlet section, said cap having an axial bore to permit the passage of a valve stem for operating said valve body and clamping means for fixing said valve to said gas feed duct on one side thereof, and a nut threadably engageable to said outlet section to fix said valve by pressing on the opposite side of said gas feed duct, whereby said valve will be able to take gas directly from the interior of said gas feed duct and discharge it outwardly of said gas feed duct in a controlled fashion.

2. A gas feed valve according to claim 1 wherein said inlet bores comprise a pair of radially extending bores through the side wall of said valve body, said bores being spaced 90° on the circumference of said valve body, a circumferential groove on the outer surface of said side wall of the valve body, extending throughout the circumference of said valve body, and a C-shaped restrictor ring housed in said circumferential groove, with the cut-away portion of said C-shaped restrictor ring matching the position of one of said radially extending bores of said valve body, said C-shaped restrictor ring having an embossment spaced 90° from the centerline of said cut-away portion, said embossment having a central orifice of small diameter and said embossment matching the position of the other of said radially extending bores of said valve body and protruding thereinto in order to fix the position of said restrictor ring.

3. A gas feed valve according to claim 1 wherein said valve stem is capable of being rotated to three positions spaced 90° from each other, namely, a first or closed position wherein the radial bore of said valve member does not match any one of the bores of the valve body, a second or maximum flow position wherein the radial bore of the valve member matches the larger diameter bore of the valve body, and a third or minimum flow position wherein the radial bore of the valve member matches the smaller diameter bore of the valve body.

4. A gas feed valve according to claim 3 wherein said positions of the valve stem are fixed by the provision of two stops spaced apart 180° on the inner wall of said valve body and a slot midway from said two stops, said valve stem having a radially extending bolt which cooperates with said stops and said slot when said valve stem is rotated.

5. A gas feed valve according to claim 4 wherein said valve stem is biased by means of a spring in order to force said radially extending bolt to enter into said slot when the valve stem is rotated.

6. A gas feed valve according to claim 1 wherein said larger diameter bore of said valve body has a frusto conical shape with the smaller diameter of said frusto conical shape on the outer surface of the side wall of said valve body and the larger diameter of said frusto conical shape on the inner wall of said valve body, whereby a variable rate of flow of gas is obtained depending on the relative position of the radial bore of said valve member with respect to said frusto conical bore of the valve body.

7. A gas feed valve according to claim 1 wherein said main gas feed duct is of a rectangular cross section, said clamping means being arranged on said cap of the valve to engage one of the larger sides of said duct, said outlet section of said valve body being a tubular section which extends through the opposite larger side of said duct, said tubular section having outer threads for receiving said nut which, when tightened, presses said duct against said clamping means to fix the relative positions of said cut and said valve, with the inlet bores of said valve body being placed within the inner space of said duct through which the gas flows.

* * * * *

UNITED STATES PATENT AND TRADEMARK OFFICE
CERTIFICATE OF CORRECTION

PATENT NO. : 5,277,221
DATED : January 11, 1994
INVENTOR(S) : Jose A. Amaya

It is certified that error appears in the above-indentified patent and that said Letters Patent is hereby corrected as shown below:

On the title page, under "OTHER PUBLICATIONS", "East" should be --Easy--.

On the title page, in the Abstract, line 8, after "discharge" delete the comma.

Col. 1, line 48, after "the" insert --valves--;

Col. 1, line 48, "consequently" should be --Consequently--.

Col. 4, line 39, delete "and".

Col. 4, line 45, after "wall" insert --,-- (comma).

Col. 5, line 9, "an" should be --and--.

Signed and Sealed this

Fifteenth Day of November, 1994

Attest:

BRUCE LEHMAN

*Attesting Officer*  *Commissioner of Patents and Trademarks*